United States Patent [19]
Lambing et al.

[11] Patent Number: 5,160,771
[45] Date of Patent: Nov. 3, 1992

[54] JOINING METAL-POLYMER-METAL LAMINATE SECTIONS

[75] Inventors: Cynthia L. T. Lambing, Kiskiminetas; James A. Colpo; William C. Herbein, both of Murrysville, all of Pa.

[73] Assignee: Structural Laminates Company, New Kensington, Pa.

[21] Appl. No.: 588,752

[22] Filed: Sep. 27, 1990

[51] Int. Cl.⁵ ............................................. B32B 3/00
[52] U.S. Cl. ..................................... 428/57; 428/33; 428/58; 428/60; 428/77; 428/189; 428/192; 428/457; 428/458; 156/157; 156/182
[58] Field of Search ............ 428/33, 57, 58, 60, 428/77, 189, 192, 458; 156/157, 182

[56] References Cited

U.S. PATENT DOCUMENTS

| | | | |
|---|---|---|---|
| 2,732,597 | 1/1956 | Contratto | 428/60 |
| 3,016,316 | 1/1962 | Olson | 154/45.9 |
| 3,205,121 | 9/1965 | Eichler et al. | 161/231 |
| 3,745,051 | 7/1973 | Griffin et al. | 428/192 |
| 4,156,054 | 5/1979 | Gurewitsch | 428/583 |
| 4,279,676 | 7/1981 | Morrison et al. | 156/159 |
| 4,435,237 | 3/1984 | Hoelzinger | 156/157 |
| 4,489,123 | 12/1984 | Schijve | 428/213 |
| 4,840,825 | 6/1989 | Aristodimou | 428/77 |

Primary Examiner—Paul J. Thibodeau
Assistant Examiner—Leszek Kiliman
Attorney, Agent, or Firm—Glenn E. Klepac

[57] ABSTRACT

A metal-polymer-metal laminate is made by joining adjacent laminate sections in a staggered relationship. Terminal portions of metal layers in a first laminate section are opposed to ends of fiber-reinforced polymer layers in a second laminate section. End portions of fiber-reinforced polymer layers in the first laminate section are opposed to ends of metal layers in a second laminate section. The two laminate sections are then joined by an adhesive layer.

17 Claims, 4 Drawing Sheets

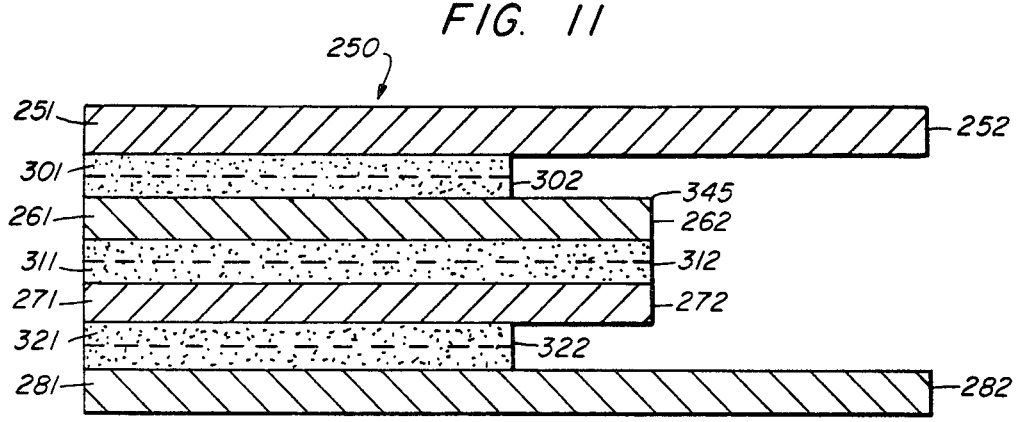
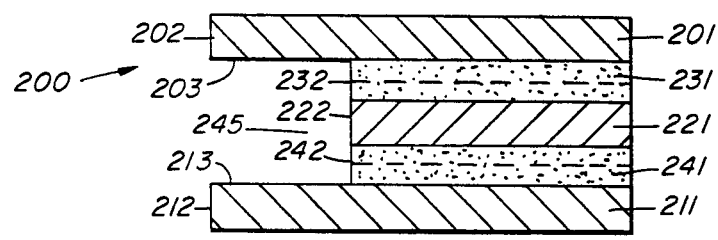
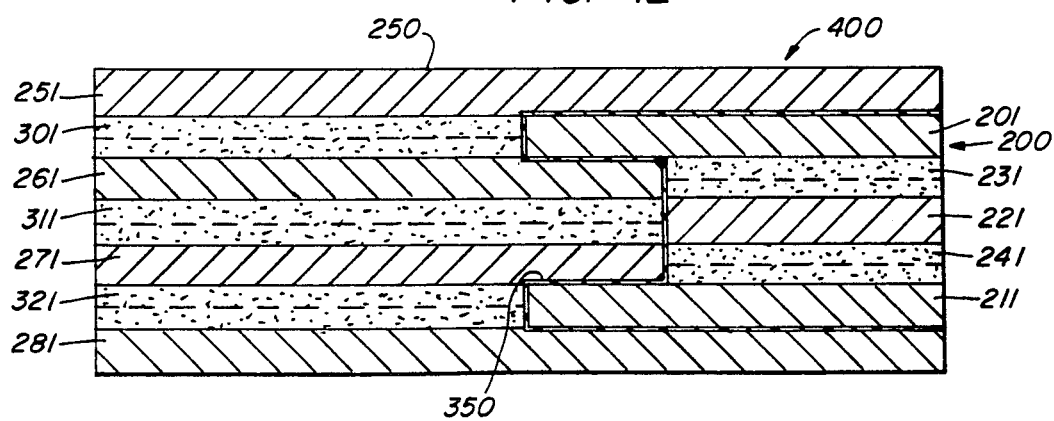

JOINING METAL-POLYMER-METAL LAMINATE SECTIONS

FIELD OF THE INVENTION

The present invention relates to the joining of metal-polymer-metal laminate sections. More particularly, the invention relates to a laminate made by adhesively joining adjacent laminate sections in a staggered relationship without inserting penetrating fastener elements in the joint area.

Metal-polymer-metal laminates made with fiber-reinforced polymer layers are now being sold in commercial quantities to the aircraft industry. Such laminates are manufactured in panels having a size of about 100 in×52 in (254 cm×132 cm). The maximum size limit imposed upon the laminates by present manufacturing technology is approximately 180 in×60 in (457 cm×152 cm). Because of these manufacturing limits, there is a need for a method of joining adjacent panels or sections which will provide larger structures.

BACKGROUND OF THE INVENTION

Techniques for joining adjacent laminated composite structures are known in the prior art. However, prior art techniques generally require insertion of fastening elements such as screws, bolts or rivets through the structure with consequent weakening in the joint area. One objective of the present invention is to provide a technique for adhesively joining adjacent metal-polymer-metal laminate sections that does not require penetration by additional fastening elements through the structure.

Another prior art joining technique requires lapping or doubling of adjacent laminate sections, thereby increasing stiffness in the joint area. A second objective of the present invention is to provide a joining technique not requiring the laminate sections to be lapped in the joint area.

A further objective of the invention is to provide a laminate having improved impact strength compared with laminates penetrated by through fasteners. The laminate of the invention is also expected to have improved tensile strength and compressive strength.

Some prior art references disclosing joining techniques for laminated composite structures are Morrison et al U.S. Pat. No. 4,279,676; Eichler et al U.S. Pat. No. 3,205,121; Olson U.S. Pat. No. 3,016,316; Hoelzinger U.S. Pat. No. 4,435,237; and Aristodimou U.S. Pat. No. 4,840,825. None of these references discloses or suggests a metal-polymer-metal laminate made by adhesively joining adjacent laminate sections as claimed herein.

Additional objectives and advantages of the present invention will become apparent to persons skilled in the art from the following detailed description.

SUMMARY OF THE INVENTION

In accordance with the present invention, there is provided a metal-polymer-metal laminate made by joining adjacent laminate sections in a staggered relationship. The term "staggered" refers to the fact that ends of metal layers in a first laminate section are opposed to ends of polymer layers in a second laminate section, and that ends of polymer layers in the first laminate section are opposed to ends of metal layers in the second laminate section. This staggered relationship is easier to manufacture and provides improved properties compared with laminates made by joining adjacent sections using prior art techniques.

The metal layers employed in the laminate sections may have a thickness of about 0.1-2.0 mm, preferably about 0.2-1.0 mm. In a particularly preferred embodiment, the metal layers have a thickness of about 0.0115-0.0125 in (0.29-0.32 mm). The metal employed in such layers may be aluminum, iron, titanium, magnesium, copper, or various alloys thereof. Aluminum alloys of the 2000, 6000, and 7000 (Aluminum Association) series are preferred. The total number of metal layers in each section is about 2 to 20.

The polymer layers in the laminate sections may have a thickness of about 0.1-1.5 mm, preferably about 0.15-0.8 mm. The polymer layers preferably have lesser thickness than the metal layers. In a particularly preferred embodiment, the polymer layers have a thickness of about 0.008-0.009 in (0.20-0.23 mm). The total number of polymer layers in each section may be about 1 to 19.

The polymer employed in the polymer layers may be thermosetting or thermoplastic. Some suitable thermosets are epoxies, unsaturated polyesters, vinyl esters, and phenolic resins. Some suitable thermoplastics are polyamides, aromatic polyesters, polyarylates, polyphenylene sulfide, polyether ketones, and liquid crystal polymers. Epoxy resins are particularly preferred.

The polymer layers are reinforced with fibers having high tensile strength. The reinforcing fibers may be glass, ceramic, carbon, polyolefin, or aromatic polyamide. In a preferred embodiment, poly-p-phenylene terephthalamide fibers are employed.

The adhesive layer of the invention will generally be made from the same polymer employed in the polymer layers. Epoxy resin adhesives are particularly preferred.

The laminate sections may be prestressed or unstressed before being joined. A particularly preferred prestressed laminate section is made in accordance with Schijve et al U.S. Pat. No. 4,489,123. A particularly preferred unstressed laminate section is made in accordance with Schijve et al U.S Pat. No. 4,500,589. The disclosures of both said Schijve et al patents are incorporated herein by reference to the extent consistent with the present invention.

In two preferred embodiments, the laminate sections are prestressed by applying an external tensile force so that a specific elongation is applied to the entire laminate which is greater than the specific elastic elongation of the metal sheets or layers and smaller than the specific break elongation of the reinforcing fibers. The specific elongation brought about by the tensile force is about 0.2-2%, with 0.4% specific elongation in the preferred embodiments. The metal metal layers making up the laminate sections comprise a 7475 (Aluminum Association series) aluminum alloy in these preferred embodiments.

BRIEF DESCRIPTION OF THE DRAWINGS

FIGS. 10, 11, and 12 are cross-sectional views of a fourth embodiment of the invention.

DETAILED DESCRIPTION OF PREFERRED EMBODIMENTS

Figure 1:
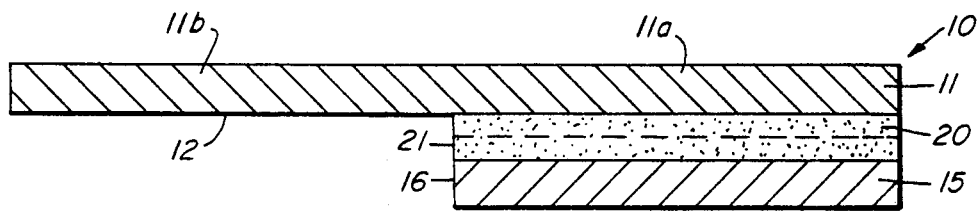
FIGS. 1, 2, and 3 are cross-sectional views of a first embodiment of the invention.

A first embodiment of the present invention is described with reference to FIGS. 1-3. There is shown in FIG. 1 a first laminate section 10 comprising a first metal layer 11 having an internal surface 12; a second metal layer 15 having a lateral end 16; and a fiber-reinforced first polymer layer 20 between the first and second metal layers. The first polymer layer 20 has a lateral end 21 aligned with the lateral end 16 of the second metal layer 15.

The first metal layer 11 comprises a body portion 11a joined to the first polymer layer 20 and a lateral extension 11b extending laterally of the body portion 11a. The body portion 11a, first polymer layer 20, and second metal layer 15 make up a first body or first portion of the first laminate section 10.

Figure 2:
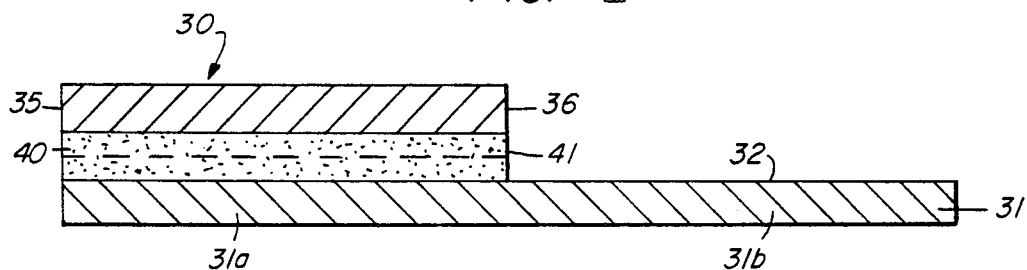

There is shown in FIG. 2 a second laminate section 30. The second section 30 comprises a first metal layer 31 having an internal surface 32; a second metal sheet 35 having a lateral end 36; and a fiber-reinforced first polymer layer 40 between the first metal layer 31 and second metal layer 35. The first polymer layer 40 has a lateral end 41 generally aligned with the lateral end 36 of the second metal layer 35.

The first metal layer 31 comprises a body portion 31a joined to the first polymer layer 40 and a lateral extension 31b extending laterally of the body portion 31a. The body portion 31a, first polymer layer 40, and second metal layer 35 make up a first body or first portion of the first laminate section 10.

Figure 3:
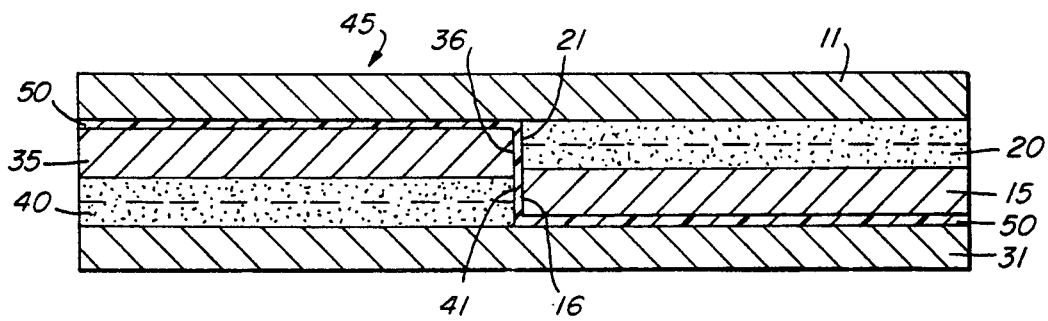

There is shown in FIG. 3 a completed laminate 45 made by joining the first laminate section 10 of FIG. 1 to the second laminate section 30 of FIG. 2. The sections 10, 30 are joined by means of an adhesive layer 50 applied to adjacent surfaces. As shown in FIG. 3, the adhesive layer 50 extends laterally between the first metal layer 11 and second metal layer 35; transversely between the second metal layer 35 and first polymer layer 20 and between the first polymer layer 40 and second metal layer 15; and laterally between the second metal layer 15 and first metal layer 31.

As shown in FIG. 3, the lateral end 16 of the second metal layer 15 and the lateral end 21 of the first polymer layer 20 both extend generally transverse to the first metal layer 11. Similarly, the lateral end 36 of the second metal layer 35 and the lateral end 41 of the first polymer layer 40 both extend generally transverse to the first metal layer 31. As used herein, the term "generally transverse" does not require a 90° angle. Rather, it is contemplated that surfaces or structures described as having generally transverse orientation extend at an angle of about 45° or more with respect to their respective reference surfaces or structures.

Figure 4:
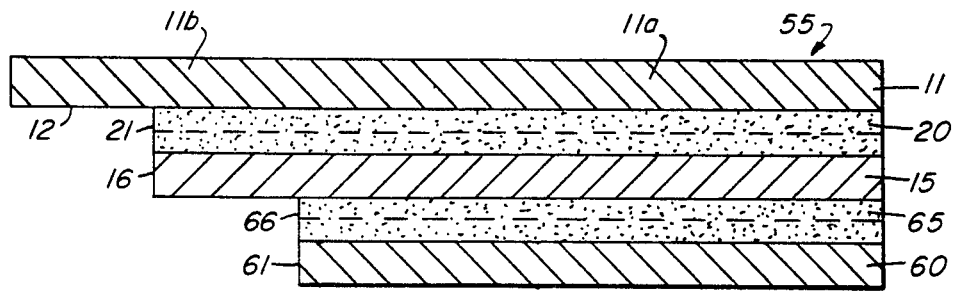
FIGS. 4, 5, and 6 are cross-sectional views of a second embodiment of the invention.
Figure 5:
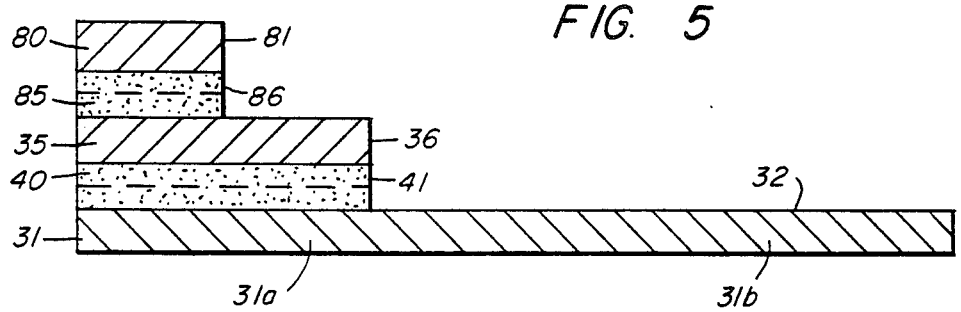
Figure 6:
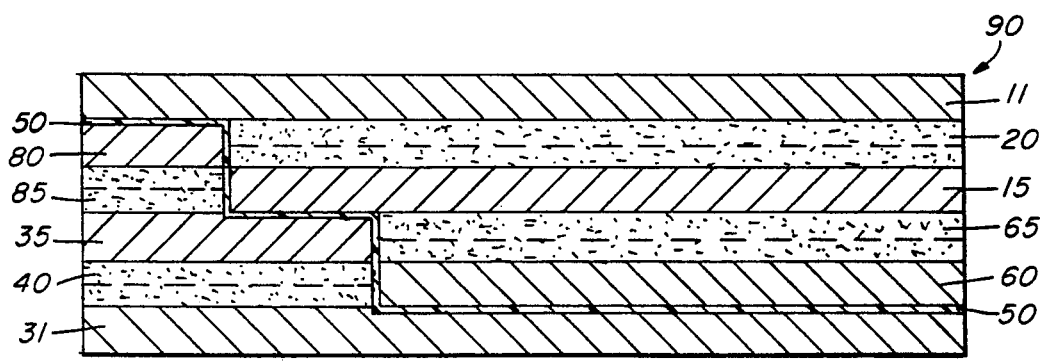

A second embodiment of the invention is illustrated in FIGS. 4-6.

FIG. 4 shows a first laminate section 55 comprising a first metal layer 11, a second metal layer 15, and a third metal layer 60. A fiber-reinforced first polymer layer 20 joins the first metal layer 11 and second metal layer 15. A fiber-reinforced second polymer layer 65 joins the second metal layer 15 and third metal layer 60. The third metal layer 60 has a lateral end 61 aligned with a lateral end 66 of the second polymer layer 65, as shown in FIG. 4.

A second laminate section 70 is shown in FIG. 5. The section 70 comprises first, second, and third metal layers 31, 35, 80; and fiber-reinforced first and second polymer layers 40, 85. The third metal layer 80 has a lateral end 81. The second polymer layer 85 has a lateral end 86 generally aligned with the end 81.

The first section 55 and second section 70 are joined together to form a unitary-metal polymer-metal laminate 90, all shown in FIG. 6. An adhesive layer 50 adhesively bonds the two sections 55, 70 in both transverse and lateral directions.

Figure 7:
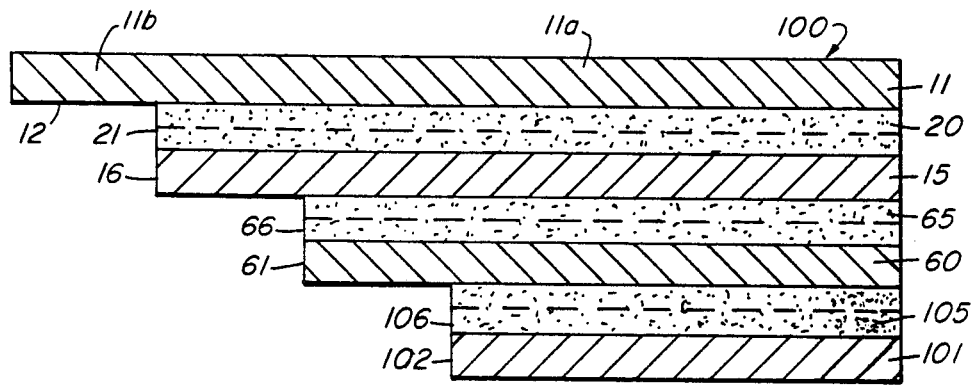
FIGS. 7, 8, and 9 are cross-sectional views of a third embodiment of the invention.
Figure 8:
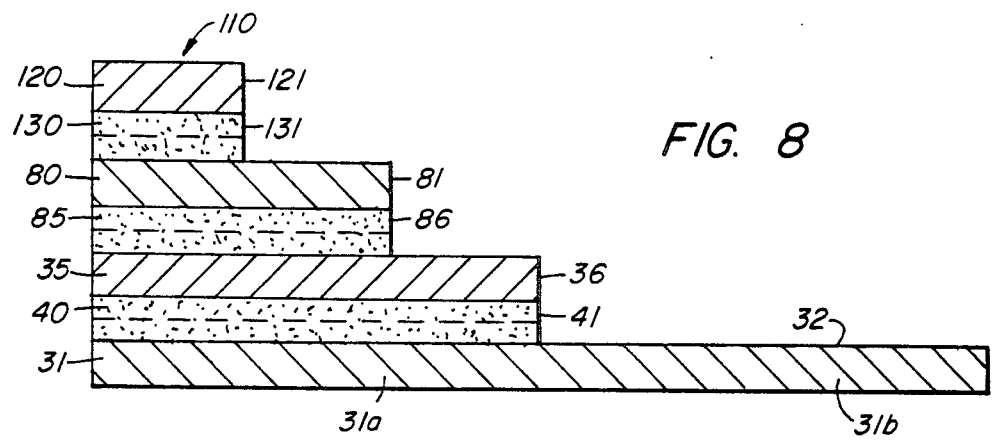
Figure 9:
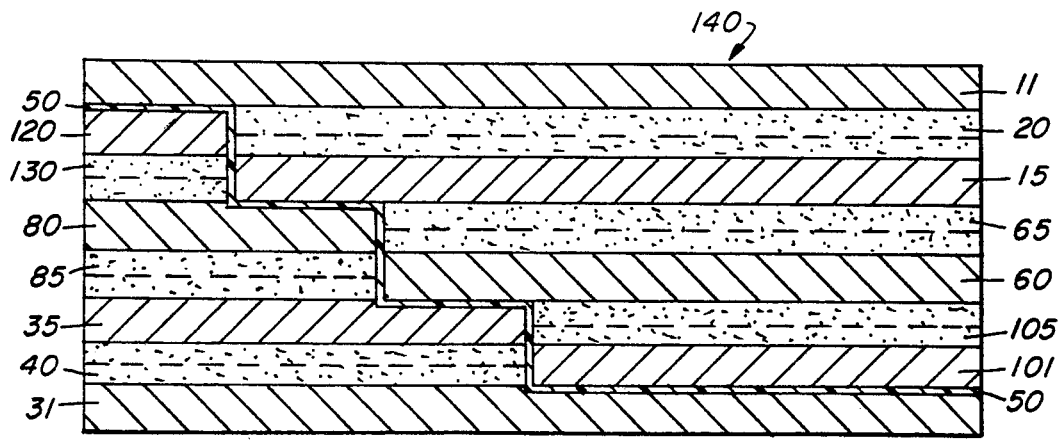

A third embodiment of the invention is shown in FIGS. 7-9.

A first laminate section 100 shown in FIG. 7 comprises first, second, third, and fourth metal layers 11, 15, 60, 101; and fiber-reinforced first, second, and third polymer layers 20, 65, 105. The fourth metal layer 101 has a lateral end 102 generally aligned with a lateral end 106 of the third polymer layer 105.

A second laminate section 110 is shown in FIG. 8. The second section 110 comprises first, second, third, and fourth metal layers 31, 35, 80, 120; and fiber-reinforced first, second, and third polymer layers 40, 85, 130. The fourth metal layer 120 has a lateral end 121 generally aligned with a lateral end 131 of the third polymer layer 130. The end portion 121 of the youth metal layer 120 and end 131 of the third polymer layer 130 are laterally displaced from ends 36, 81 of the second and third metal layers 35, 80.

FIG. 9 shows a completed laminate 140 made by joining the first laminate section 100 of FIG. 7 to the second laminate section 110 of FIG. 8. The sections 100, 110 are joined by adhesive layer 50 applied to adjacent surface portions of each structure. The adhesive layer 50 traverses a complex path between adjacent portions of various metal and polymer layers in the laminate 140.

A fourth embodiment of the invention is described below with reference to FIGS. 10-12.

A first laminate section 200 shown in FIG. 10 comprises a first metal layer 201 having a lateral edge 202 and an interior surface 203; a second metal layer 211 spaced transversely from the first layer 200 and having a lateral edge 212 and an interior surface 213; and a third metal layer 221 between the first and second metal layers 201, 211. The third metal layer 221 has a lateral edge 222 spaced laterally inwardly of the other lateral edges 202, 212.

The first laminate section 200 further comprises a fiber-reinforced first polymer layer 231 having a lateral edge 232 spaced laterally inwardly of the lateral edges 202, 212; and a fiber-reinforced second polymer layer 241 also having a lateral edge 242 spaced laterally of the lateral edges 202, 212. The two lateral edges 232, 242 are generally aligned in the preferred embodiment shown. A slot 245 is defined by the first and second metal layers 201, 211; lateral edge 222; and lateral edges 232, 242.

A second laminate section 250 shown in FIG. 11 comprises first, second, third, and fourth metal layers 251, 261, 271, 281, each having a lateral edge 252, 262, 272, 282. Fiber-reinforced first, second, and third polymer layers 301, 311, 321, are interposed between the metal layers. The polymer layers 301, 311, 321 each have a lateral edge 302, 312, 322.

As shown in FIG. 11, edges 262, 272, 312 extend laterally outwardly of edges 252, 282, 302, 322. The portion of the second section 250 extending outwardly comprises a key 345 corresponding to the slot 245 in the first section 200.

The first section 200 and second section 250 are joined by an adhesive layer 350 to form a unitary metal-polymer laminate 400 shown in FIG. 12. In this laminate 400, lateral edges 302, 312, 322 of the polymer layers are opposed to respective edges 202, 222, 212, of the metal layers 201, 221, 211. Lateral edges 232, 242 of the polymer layers 231, 241 are opposed to lateral edges 262, 272 of the metal layers 261, 271.

EXAMPLES

Some examples of suitable metal-polymer-metal laminates comprising the laminate sections of the present invention are as follows:

| Example | Metal | Polymer | Stretch |
| --- | --- | --- | --- |
| 1 | 7475 T61 | Aluminum | AF 163 | 0.4% |
| 2 | 2024 T3 | Aluminum | AF 163 | None |
| 3 | 7475 T761 | Aluminum | AF 163 | 0.4% |
| 4 | 2024 T81 | Aluminum | AF 191 | None |

The metal layers in Examples 1–4 have a thickness of about 0.0115–0.0125 in (0.29–0.32 mm).

The AF 163 polymer in Examples 1–3 is a thermosetting epoxy resin having a cure temperature of 250° F. and a maximum service temperature of 200° F. The same epoxy is employed as the adhesive layer for joining laminate sections made in accordance with Examples 1–3.

The AF 191 polymer in Example 4 is a thermosetting epoxy resin having a cure temperature of 350° F. and a maximum service temperature of 300° F. The same epoxy is used to join laminate sections made in accordance with Example 4.

Each of the polymer layers has a thickness of about 0.008–0.009 in (0.20–0.23 mm). The polymer layers are reinforced with poly-p-phenylene terephthalamide fibers.

Laminate sections made in accordance with Examples 1 and 3 are provided with 0.4% permanent stretch to enhance fatigue resistance. The sections of Examples 2 and 4 are unstretched.

While the invention has been described in terms of preferred embodiments, numerous equivalents and variations will occur to persons skilled in the art. For example, there may be more layers in the laminate sections than shown in the drawings. The claims appended hereto are intended to encompass all embodiments which fall within the spirit of the invention.

What is claimed is:

1. A metal-polymer-metal laminate (45) made by adhesively joining adjacent laminate sections, said laminate (45) comprising:
   (a) a first laminate section (10) comprising:
      (i) a first metal layer (11);
      (ii) a second metal layer (15) having a lateral end (16), said second metal layer (15) being laterally non-coextensive with the first metal layer (11); and
      (iii) a fiber-reinforced first polymer layer (20) between said first metal layer (10) and second metal layer (15), said first polymer layer (20) having a lateral end (21); (b) a second laminate section (30) comprising:
      (i) a first metal layer (31) opposed to a metal layer (15);
      (ii) a second metal layer (35) having a lateral end (36) opposed to the lateral end (21) of a polymer layer (20), said second metal layer (35) being laterally non-coextensive with the first metal layer (31); and
      (iii) a fiber-reinforced first polymer layer (40) between said first metal layer (31) and second metal layer (35), said first polymer layer (40) having a lateral end (41) opposed to the lateral end (16) of a metal layer (15) in the first laminate section (10); and
   (c) an adhesive layer (50) interposed between said first and second laminate sections (10, 30) and adhesively joining them together.

2. The laminate of claim 1 wherein said lateral end (16) of the second metal layer (15) and said lateral end (21) of the first polymer layer (20) extend generally transverse to said first metal layer (11) in the first laminate section (10).

3. The laminate of claim 1 wherein said lateral end (36) of the second metal layer (35) and said lateral end (41) of the first polymer layer (40) extend generally transverse to said first metal layer (31) in the second laminate section (30).

4. The laminate of claim 1 wherein said first laminate section (10) further comprises:
   (iv) a third metal layer (60) having a lateral end (61); and
   (v) a fiber-reinforced second polymer layer (65) between said second metal layer (15) and third metal layer (60), said second polymer layer (65) having a lateral end (66); and said second laminate section (30) further comprises:
   (iv) a third metal layer (80) having a lateral end (81) opposed to a lateral end (21) of a polymer layer (20) in the first laminate section (10); and
   (v) a fiber-reinforced second polymer layer (85) between said second metal layer (35) and third metal layer (30), said second polymer layer (85) having a lateral end (86) opposed to a lateral end (16) of a metal layer (15) in the first laminate section (10).

5. The laminate of claim 4 wherein said first laminate section (10) further comprises:
   (vi) a fourth metal layer (101) having a lateral end (102); and
   (vii) a fiber-reinforced third polymer layer (105) between said third metal layer (60) and fourth metal layer (101), said third polymer layer (105) having a lateral end (106); and said second laminate section (30) further comprises:
   (vi) a fourth metal layer (120) having a lateral end (121) opposed to a lateral end (21) of a polymer layer (20) in the first laminate section (10); and
   (vii) a fiber-reinforced third polymer layer (130) between said third metal layer (80) and fourth metal layer (120), said third polymer layer (130) having a lateral end (131) opposed to a lateral end (16) of a metal layer (15) in the first laminate section (10).

6. The laminate of claim 1 wherein said adhesive layer (50) joins said first metal layer (11) in the first laminate section (10) to said second metal layer (35) in the second laminate section (30).

7. The laminate of claim 4 wherein said adhesive layer (50) joins said first metal layer (11) in the first laminate section (10) to said third metal layer (80) in the second laminate section (30).

8. The laminate of claim 5 wherein said adhesive layer (50) joins said first metal layer (11) in the first laminate section (10) to said fourth metal layer (120) in the second laminate section (30).

9. The laminate of claim 1 wherein said metal layers (11, 15, 31, 35) each comprise an aluminum alloy.

10. The laminate of claim 1 wherein said polymer layers (20, 40) each comprise a thermosetting epoxy resin.

11. The laminate of claim 1 wherein said adhesive layer (50) comprises a thermosetting epoxy resin.

12. The laminate of claim 1 wherein said polymer layers (20, 40) are reinforced with fibers comprising a material selected from the group consisting of aramids, polyolefins, glass, carbon and ceramics.

13. The laminate of claim 1 wherein said polymer layers (20, 40) are reinforced with poly-p-phenylene terephthalamide fibers.

14. The laminate of claim 1 wherein said polymer layers (20, 40) each have lesser thickness than each said metal layers (11, 15, 31, 35).

15. A metal-polymer-metal laminate (400) made by joining adjacent laminate sections, said laminate (400) comprising:
   (a) a first laminate section (200) comprising:
      (i) a first metal layer (201) having a lateral edge (202);
      (ii) a second metal layer (211) spaced from said first metal layer (201) and having a lateral edge (212);
      (iii) a third metal layer (221) intermediate said first metal layer (201) and second metal layer (211), said third metal layer (221) having a lateral edge (222) spaced laterally inwardly of the lateral edges (202, 212) of said first and second metal layers (201, 211);
      (iv) a fiber-reinforced first polymer layer (231) between the first and third metal layers (201, 221), said first polymer layer (231) having a lateral edge (232) spaced laterally inwardly of the lateral edges (202, 212) on said first and second metal layers (201, 211); and
      (v) a fiber-reinforced second polymer layer (241) between the second and third metal layers (211, 221), said second polymer layer (241) having a lateral edge (242) spaced laterally inwardly of the lateral edges (202, 212) on said first and second metal layers (201, 211);
   said first, second and third metal layers (201, 211, 221) and said first and second polymer layers (231, 241) defining a slot (245);
   (b) a second laminate section (250) comprising:
      (i) first, second, third and fourth metal layers (251, 261, 271, 281), said second and third metal layers (261, 271) each having a lateral edge (262, 272) opposed to a lateral edge (232, 242) of a polymer layer (231, 241) in the first laminate section (200); and
      (ii) fiber-reinforced first, second and third polymer layers (301, 311, 321) between the metal layers (251, 261, 271, 281), said polymer layers (301, 311, 321) each having a lateral edge (302, 312, 322) opposed to a lateral edge (202, 222, 212) of a metal layer (201, 221, 211) in the first laminate section (200); and
   (c) an adhesive layer (350) joining said first laminate section (200) to the second laminate section (250).

16. The laminate of claim 15 wherein said second laminate section (250) defines a key (345) fitted within said slot (245).

17. The laminate of claim 15 wherein said polymer layers (231, 241, 301, 311, 321) each have lesser thickness than each said metal layers (201, 211, 221, 251, 261, 271, 281).

* * * * *